United States Patent [19]

Thring

[11] 4,369,746
[45] Jan. 25, 1983

[54] CATALYTIC COMBUSTION ENGINES

[75] Inventor: Robert H. Thring, Steyning, England

[73] Assignee: Ricardo Consulting Engineers Limited, Sussex, England

[21] Appl. No.: 184,373

[22] Filed: Sep. 5, 1980

[30] Foreign Application Priority Data

Aug. 23, 1979 [GB] United Kingdom ............... 7929332
Sep. 5, 1979 [GB] United Kingdom ............... 7930836

[51] Int. Cl.³ ............................................ F02B 19/08
[52] U.S. Cl. ................................ 123/261; 123/263; 123/272; 123/143 B
[58] Field of Search ............ 123/272, 262, 263, 670, 123/261, 143 B, 143 R

[56] References Cited

U.S. PATENT DOCUMENTS

| 2,113,711 | 4/1938 | Ricardo | 123/275 |
| 2,632,296 | 3/1953 | Houdry | 60/39.02 |
| 2,821,177 | 1/1958 | Holt | 123/262 |
| 2,911,959 | 10/1959 | Millington | 123/263 |
| 3,481,317 | 12/1969 | Hughes et al. | 123/143 |
| 3,648,676 | 3/1972 | Lowman, Jr. | 123/670 |
| 3,923,011 | 12/1975 | Prefferle | 123/143 R |
| 3,963,003 | 6/1976 | Downs | 123/263 |
| 4,092,967 | 6/1978 | Haslett | 123/143 B |

FOREIGN PATENT DOCUMENTS

| 337966 | 6/1921 | Fed. Rep. of Germany . |
| 364253 | 2/1923 | Fed. Rep. of Germany . |
| 392929 | 3/1924 | Fed. Rep. of Germany . |
| 2618961 | 11/1976 | Fed. Rep. of Germany . |
| 2547577 | 4/1977 | Fed. Rep. of Germany . |
| 2700911 | 7/1977 | Fed. Rep. of Germany . |
| 2843343 | 10/1978 | Fed. Rep. of Germany . |
| 549134 | 2/1923 | France . |
| 1123306 | 9/1956 | France . |
| 202080 | 8/1923 | United Kingdom | 123/670 |
| 226766 | 12/1924 | United Kingdom . |
| 343942 | of 1931 | United Kingdom . |
| 366008 | 1/1932 | United Kingdom . |
| 384496 | 12/1932 | United Kingdom . |
| 414398 | 7/1934 | United Kingdom . |
| 431345 | 7/1935 | United Kingdom . |
| 445086 | 4/1936 | United Kingdom . |
| 690805 | 4/1953 | United Kingdom . |
| 690825 | 4/1953 | United Kingdom . |
| 831311 | 3/1960 | United Kingdom . |
| 1273053 | 5/1972 | United Kingdom . |
| 1473694 | 5/1977 | United Kingdom . |
| 2039612 | 8/1980 | United Kingdom . |

Primary Examiner—Charles J. Myhre
Assistant Examiner—Andrew M. Dolinar
Attorney, Agent, or Firm—Price, Heneveld, Huizenga & Cooper

[57] ABSTRACT

A reciprocating-piston internal combustion engine with catalytic combustion has associated with the or each cylinder a swirl-promoting precombustion chamber in the cylinder head connected to the space in the cylinder above the piston by an inclined transfer passage formed in a "hot plug" inserted in a well in the head. A catalytic screen preferably comprising a platinum gauze extends across the top of the hot plug with its peripheral margin wrapped around the hot plug and trapped between the plug and the cylinder head. The plug has an open-topped recess formed in its upper side, into which recess the transfer passage leads, the recess constituting the lower part of the precombustion chamber and the catalytic screen separating this recess from the remainder of the interior of the precombustion chamber above the screen. An injector injects liquid fuel into the precombustion chamber above and parallel to the catalytic screen. The engine has a very much lower compression ratio than a normal compression-ignition engine, for example in the range 11:1 to 15:1, and can operate on gasoline, methanol or diesel fuel.

16 Claims, 3 Drawing Figures

CATALYTIC COMBUSTION ENGINES

BACKGROUND OF THE INVENTION

This invention relates to reciprocating-piston internal combustion engines of the type which employs a catalyst in the or each combustion chamber to initiate and promote combustion at the compression temperature in the chamber. Such engines are referred to herein as catalytic combustion engines.

One object of the present invention is to provide an internal combustion engine capable of operation at a compression ratio higher than is normal practice for a spark-ignited gasoline engine using high-octane-number commercial gasoline, but very much lower than the minumum required for compression-ignition of the injected fuel in a Diesel engine.

For example, it can be shown that the optimum compression ratio of an i.c. engine for brake power output is around 12:1. This is based on the fact that the ideal thermal efficiency of an i.c. engine follows a law of the type $$\eta = 1 - \left(\frac{1}{R}\right)^{\gamma-1}$$

where R is the compression ratio and $\gamma$ is the ratio of the specific heat of air at constant pressure to that at constant volume. The efficiency $\eta$ of the engine when plotted against compression ratio R shows an initially-rapid rise which progressively flattens off as the compression ratio increases. The consequence of increasing the compression ratio is to increase the motoring loss of the engine, i.e. the ideal indicated mean effective pressure will have a greater mean pressure element due to friction subtracted from it to arrive at the net or brake mean effective pressure which represents the actual output. The optimum value of compression ratio having regard to the brake power output is found to be around 12:1.

This has been demonstrated practically with spark-ignited gasoline engines, but with compression ratios of around 12:1 these require the use of special gasolines having a high resistance to "pre-ignition", i.e. uncontrolled self-ignition prior to the instant of spark ignition of the charge, and to "knock" due to self-ignition of part of the charge in a remote part of the combustion chamber after the normal ignition of the charge by the timed spark. Such fuels are not widely available commercially. The use of compression ratios of this order in production gasoline engines is therefore not viable.

The normal Diesel engine requires a very high compression ratio to raise the temperature in the combustion chamber to a value at the end of compression which will permit the self-ignition of the diesel fuel spray when injected into the combustion chamber shortly before top-dead-centre. As the swept volume of the individual cylinders is reduced a higher compression ratio becomes necessary to offset the loss of charge heat during compression. For example in a small compression-ignition engine having a Ricardo Comet Mark V precombustion chamber (British Pat. No. 786,329) a compression ratio of around 21:1 is necessary to give satisfactory cold starting (using a heater plug) and high-speed light load operation without misfiring, using diesel distillate as the injected fuel. It would be quite impossible to operate such an engine with a compression ratio as low as 12:1.

It would moreover be quite impossible to operate such a compression-ignition engine on gasoline of 91 RON (Research Octane Number) or on methanol (methyl alcohol) with RON > 100 as the injected fuel, at a compression ratio of 12:1 or even as high as 21:1. This is because good quality gasoline such as is normally used in a spark-ignited engine has a high self-ignition temperature which is the chief characteristic of its high octane number, and in consequence has either a long ignition delay period or will fail to ignite altogether when injected into an engine cylinder under conditions of compression pressure and temperature such that diesel fuel would readily ignite.

DESCRIPTION OF THE PRIOR ART

Several proposals have been made to provide a catalytic combustion engine having a precombustion chamber with a catalytic ignition element mounted in that chamber. For example, in British Pat. No. 366008 there is proposed a catalytic combustion engine having a part-cylindrical precombustion chamber into which leads a transfer passage arranged to direct a compressed air charge from the cylinder tangentially into the chamber during each compression stroke to create swirl in the chamber around its axis, and having a liquid fuel injector whose nozzle is situated in the transfer passage itself to inject fuel through the mouth of the transfer passage into the precombustion chamber, a catalytic ignition element being mounted in the interior of the chamber on or spaced from its internal wall.

BRIEF SUMMARY OF THE INVENTION

According to the present invention however, a liquid-fuelled catalytic combustion engine comprises at least one cylinder head, a precombustion chamber associated with each cylinder and formed in the head, a restricted transfer passage connecting the precombustion chamber with the combustion space in the cylinder above the piston, whereby a part of the total air charge is forced through the transfer passage under pressure to enter the precombustion chamber tangentially during each compression stroke of the piston in such a manner that the charge in the precombustion chamber is caused to swirl around the interior of the chamber, and further comprising injection means for injecting liquid fuel into the precombustion chamber shortly before top-dead-centre in each compression stroke, a catalytic element in the precombustion chamber by which combustion of the air/fuel mixture is initiated and promoted in the precombustion chamber, the said catalytic element comprises a screen having a multiplicity of openings or passageways extending through its thickness through which gas can readily flow from one side to the other of the screen, the screen extending completely across the precombustion chamber to divide it into two separate volumes, namely a first volume into which the injection means injects a fuel spray at a point spaced from the screen and along a centre line whose projection does not intersect the screen, and a second volume into which the transfer passage leads, the transfer passage joining the precombustion chamber at a region spaced from the screen.

Preferably the catalytic element is of perforated sheet or grid or mesh construction, for example a gauze made of or coated with catalytic material and supported on a supporting framework.

For example where the transfer passage is formed in a so-called "hot plug" of refractory material inserted in the cylinder head, the plug being formed with a recess which provides the sides of the lower part of the precombustion chamber, the catalytic screen may extend across the top of the hot plug with its periphery interposed between the adjoining surfaces of the hot plug and the cylinder head so that the recess in the plug constitutes the said second volume of the chamber. (The engine is here considered as having its piston axis vertical with its cylinder head uppermost and the swirl axis in the precombustion chamber horizontal).

Where the "hot plug" is inserted in a well formed in the cylinder head, the peripheral margin of the catalytic screen may be wrapped around the circumference of the plug and be trapped between the plug and the surrounding circumferential wall of the well.

As indicated above, it is a feature of the invention that the injector means should be arranged to inject the fuel spray from a point spaced above the catalytic screen along a centre line whose projection does not intersect the screen. With a screen having a flat upper face, it has been found preferable for the injector means to be arranged to spray along a centre line spaced above and generally parallel to the catalytic screen, or at least not downwardly-inclined towards the screen, so that the combustible mixture of air and atomised fuel will form above the catalytic screen and without the mechanical interference involved in spraying through the screen.

A heater plug will normally be provided to assist cold starting, and should project into the precombustion chamber in a position downstream of the point of fuel injection and upstream of the mouth of the communicating passage, each with respect to the direction of flow of the swirl induced in the precombustion chamber during the compression stroke. It has been found that even though the heater plug will only be activated during cold starting, surprisingly it is beneficial during normal hot running for the heater plug to be so situated that at least a part of the injected fuel spray will impinge directly upon it.

The use of the catalytic screen as specified above in the engine of the present invention considerably enhances the ignition of the fuel injected into the precombustion chamber, and enables lower compression ratios, for example in the range 11:1 to 15:1, and more "difficult" fuels to be used than would otherwise be possible.

BRIEF DESCRIPTION OF THE DRAWINGS

Thus in one specific embodiment of the invention which will now be described by way of example only, a piston engine without spark ignition having a compression ratio of 12:1 was provided and was operated on 91 RON gasoline and also on methanol (RON 100). This embodiment is illustrated in the accompanying drawings, in which.

DESCRIPTION OF THE PREFERRED EMBODIMENT

Figure 1:
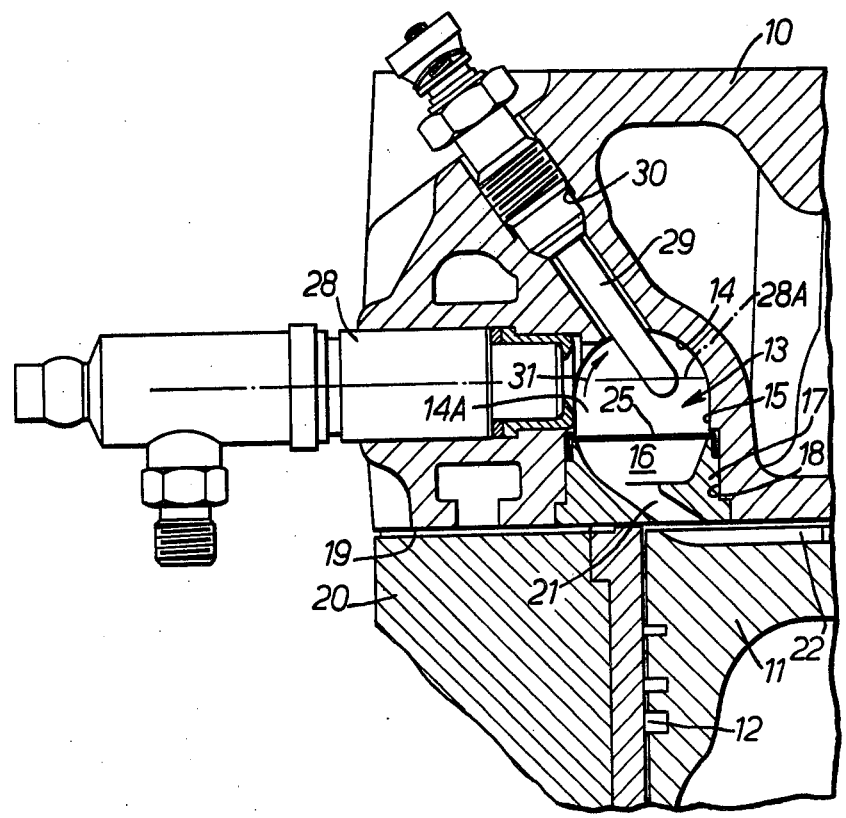
FIG. 1 is a sectional elevation through part of the cylinder head and part of the sole cylinder of the engine.
Figure 2:
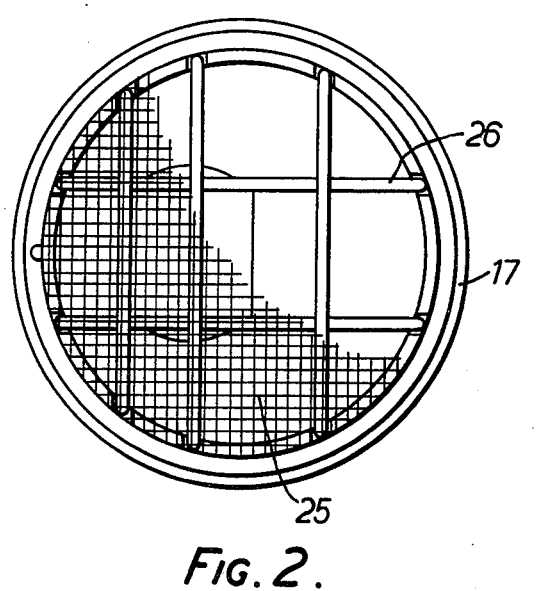
FIGS. 2 and 3 show in plan and elevation the catalytic screen positioned over the hot plug of the engine, shown removed from the cylinder head.
Figure 3:
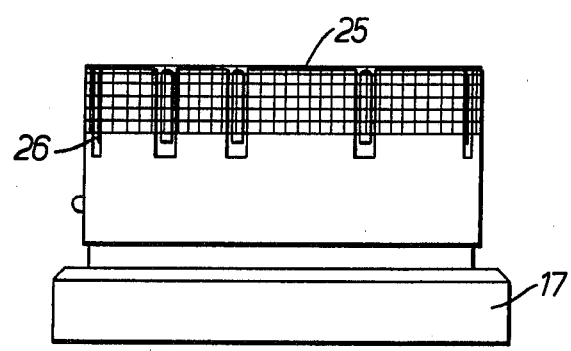

The engine of the illustrated embodiment is a single-cylinder experimental Diesel engine with a bore and stroke each of 85 mm. FIG. 1 shows part of the cylinder head 10 of the engine and part of the single piston 11 in the cylinder 12. A precombustion chamber 13 generally similar to the Ricardo Comet Mark V type (British Pat. No. 786,329) is provided in the cylinder head 10 and has a hemispherical upper part 14 merging into a short cylindrical intermediate part 15, the lower part of the precombustion chamber being formed by a shallow recess 16 in a refractory hot plug 17 inserted into a well 18 in the face 19 of the cylinder head which is applied to the top of the cylinder block 20. A transfer passage 21 inclined to the vertical axis of reciprocation of the piston is formed in the hot plug 17 and connects the interior of the precombustion chamber 13 to the clearance volume 22 above the piston 11 in the cylinder 12. During each compression stroke of the piston 11 a part of the combustion air charge admitted into the cylinder will be forced under pressure through the transfer passage 21 to enter the chamber 13 tangentially, thus setting up a swirl in the chamber in the direction indicated by arrow 31, and around a horizontal axis transverse to the axis of reciprocation of the piston 11.

A catalytic element 25 is positioned in the precombustion chamber 13, and comprises a gauze screen of catalytic material, e.g. platinum, supported on a wide-mesh carrier grid 26 of larger-diameter heat-resistant wire, the assembly being positioned to extend across the top of the recess 16 in the hot plug 17 with its circumferential margin fitted around the circumference of the plug and interposed between the plug and the adjacent surface of the well 18 so as to secure the element 25 in position in the chamber 13. The catalytic element 25 was of 25 mesh/inch gauze secured by metal stitches to the grid 26. This particular mesh size for the gauze 25 was chosen for reasons of availability and may not represent the optimum.

The catalytic element 25 thus comprises a screen which extends completely across the interior of the precombustion chamber 13, dividing the latter into an upper volume 14A into which the fuel spray is injected, and a lower volume constituted by the recess 16 in the hot plug 17.

A fuel injector 28 is mounted in a bore in the cylinder head 10 to spray liquid fuel into the upper volume 14A of the precombustion chamber 13 along a horizontal centre line 28A above and parallel to the plane of the upper face of the catalytic screen 25. The centre line 28A of injection of the injector 28 is at a level of about half the overall height of the upper volume 14A of the chamber 13 above the catalytic screen 25 and intersects a tubular heater plug 29 which is mounted in a bore 30 in the head to project into the upper volume 14A of the precombustion chamber 13 at a region downstream of the nozzle of the injector 28 with respect to the direction of swirl induced in the chamber 13, which direction is indicated by the arrow 31. A narrow injector nozzle spray angle is used, arranged so that a portion of the spray of fuel injected into the upper volume 14A of the chamber 13 will impinge directly upon the heater plug 29. As previously indicated this is found to be beneficial to combustion in normal running even though the heater plug 29 is only energised by switching on heating current for a short period prior to starting from cold, and is switched off after the start.

The use of the catalytic gauze screen 25 arranged as described considerably enhances the ignition of the fuel injected into the chamber 13 shortly before compression top-dead-centre, as has been demonstrated by the tests carried out by the applicant. Indeed, with a compression ratio of 12:1 as used for these tests, a value chosen as being near the ideal for i.c. engines as previously indicated, but at which a normal Diesel engine would not operate, it was found that using a mixture of neat gasoline (91 RON), with about 1% of lubricating oil to lubricate the fuel injection pump, as the injected fuel, and with the aid of the heater plug for starting only, the engine would start and operate satisfactorily. A later test using methanol with 1% lubricating oil as the injected fuel also gave satisfactory operation. It is believed that diesel oil could also be used satisfactorily as the fuel. Without the presence of the catalytic gauze screen 25 in the chamber 13, compression ignition and combustion of the fuel/air mixture would not be achieved at all at this compression ratio, with any of these fuels.

In these tests the combustion chamber form (apart from the injector position), the use of a high-pressure fuel injection system and the actual injection timing used were all virtually identical with those used in conventional compression-ignition engines using a Ricardo Comet Mark V combustion chamber. The experiments show that it is possible to use "difficult" fuels in the catalytic combustion engine as described and illustrated with a very much lower compression ratio than in a conventional Diesel engine, presumably because the catalytic oxidation occurs sufficiently vigorously to ignite the whole charge at a compression temperature which is much lower than usual.

It is expected that this catalytically-promoted combustion will lead to less unburnt hydrocarbon and possibly a smaller proportion of carbon monoxide in the exhaust gases.

Whilst in the first experiments described above with reference to the drawings a catalytic screen 25 of platinum gauze was used, it is possible that some other construction of or material for the element 25 might be found preferable, for example a gauze of some different, e.g. non-catalytic material coated with platinum or some other catalytic material.

Also, whilst the tests described used a cylinder head with a precombustion chamber of modified Ricardo Comet Mark V type, the invention is also applicable to heads with other types of swirl-promoting precombustion chamber connected by a transfer passage to the cylinder space above the piston, for example a chamber of the Ricardo Comet Mark II type (British Pat. No. 431,345).

I claim:

1. A liquid-fuelled reciprocating-piston I.C. engine with catalytic ignition and combustion, which comprises at least one cylinder and a cylinder head, a precombustion chamber associated with said cylinder and formed in the cylinder head, a combustion space in the cylinder above the piston, a restricted transfer passage connecting the precombustion chamber with said combustion space and positioned such that at least a part of the total air charge in the combustion space is forced through the transfer passage under pressure to enter the precombustion chamber tangentially during each compression stroke of the piston in such a manner that the charge in the precombustion chamber is caused to swirl around the interior of the chamber, and further comprising injection means for injecting liquid fuel into the precombustion chamber shortly before top-dead-centre in each compression stroke, and a catalytic element in the precombustion chamber by which combustion of the air/fuel mixture is initiated and promoted in the precombustion chamber, said catalytic element comprising a screen having a multiplicity of openings or passageways extending through its thickness through which gas can readily flow from one side to the other of the screen, the screen extending across the precombustion chamber to divide it into first and second separate volumes, said injection means being located to inject a fuel spray into said first volume at a point spaced from the screen and along a centre line whose projection does not intersect the screen, and said transfer passage leading into said second volume, the transfer passage joining the precombustion chamber at a region spaced from the catalytic element.

2. An engine as claimed in claim 1, in which said screen has a flat face directed towards the said first volume, and the centre line of injection of the fuel spray into the said first volume of the injection means is spaced from and generally parallel to that face of the screen.

3. An engine as claimed in claim 2, in which the said point of injection of the fuel spray into the first volume of the precombustion chamber lies in the upstream portion of the path of swirl of the air charge around the precombustion chamber in the said volume.

4. An engine as claimed in claim 1, in which the screen is of perforated sheet construction.

5. An engine as claimed in claim 1, in which the screen comprises a gauze having at least a surface coating of catalytic material supported on a supporting framework.

6. An engine as claimed in any one of the preceding claims, which includes a so-called "hot plug" of refractory material inserted in the cylinder head, the transfer passage being formed in the "hot plug", and the "hot plug" being formed with an open-topped recess into which the transfer passage leads said recess providing the sides of the lower part of the precombustion chamber, and in which the catalytic screen extends across the top of the "hot plug" and covers said recess, so that the recess in the "hot plug" constitutes the said second volume, the periphery of the screen being interposed between adjoining surfaces of the "hot plug" and cylinder head.

7. An engine as claimed in claim 6 having a well formed in the cylinder head, the "hot plug" being inserted in said well, and the peripheral margin of the catalytic screen being wrapped around the circumference of the "hot plug" and trapped between the plug and the surrounding circumferential wall of the well.

8. An engine as claimed in any one of claims 1 to 5 which includes a heater plug which projects into the precombustion chamber in a position downstream of the point of fuel injection and upstream of the mouth of the transfer passage, in each case with respect to the direction of flow of the swirl induced in the precombustion chamber during the compression stroke.

9. An engine as claimed in claim 8, in which the heater plug is so situated that at least a part of the injected fuel spray will impinge directly upon it in use.

10. An engine as claimed in any one of claims 1 to 5, having a compression ratio in the range from 11:1 to 15:1.

11. An engine as claimed in any one of claims 1 to 5, which includes a so-called "hot plug" of refractory material inserted in the cylinder head, the transfer passage being formed in the "hot plug", and the "hot plug" being formed with an open-topped recess into which the transfer plug leads, said recess providing the sides of the lower part of the precombustion chamber, and in which the catalytic screen extends across the top of the "hot plug" and covers said recess so that the recess in the "hot plug" constitutes the said second volume, the periphery of the screen being interposed between adjoining surfaces of the "hot plug" and cylinder head, and which includes a heater plug which projects into the precombustion chamber in a position downstream of the point of fuel injection and upstream of the mouth of the transfer passage, in each case with respect to the direction of flow of the swirl induced in the precombustion chamber during the compression stroke.

12. An engine as claimed in claim 11 having a well formed in the cylinder head, the "hot plug" being inserted in said well, and the peripheral margin of the catalytic screen being wrapped around the circumference of the "hot plug" and trapped between the plug and the surrounding circumferential wall of the well.

13. An engine as claimed in claim 11, in which the heater plug is so situated that at least a part of the injected fuel spray will impinge directly upon it in use.

14. An engine as claimed in claim 11, having a compression ratio in the range from 11:1 to 15:1.

15. An engine as claimed in claim 12, having a compression ratio in the range from 11:1 to 15:1.

16. An engine as claimed in claim 13, having a compression ratio in the range from 11:1 to 15:1.

* * * * *